(12) United States Patent
Ootsuki

(10) Patent No.: US 7,834,268 B2
(45) Date of Patent: Nov. 16, 2010

(54) METHOD AND STRUCTURE FOR WATERPROOFING A TERMINAL SPLICE

(75) Inventor: Hiroyuki Ootsuki, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 11/213,731

(22) Filed: Aug. 30, 2005

(65) Prior Publication Data
US 2006/0048965 A1 Mar. 9, 2006

(30) Foreign Application Priority Data
Sep. 9, 2004 (JP) .............................. 2004-263025

(51) Int. Cl.
*H02G 15/02* (2006.01)

(52) U.S. Cl. ................. 174/74 R; 174/74 A; 174/77 R; 174/82

(58) Field of Classification Search ............... 174/84 R, 174/87, DIG. 8, 74 A, 74 R, 77 R, 82; 29/855–859
See application file for complete search history.

(56) References Cited

U.S. PATENT DOCUMENTS

| | | | | |
|---|---|---|---|---|
| 4,504,699 | A | * | 3/1985 | Dones et al. ............... 174/84 R |
| 5,315,066 | A | * | 5/1994 | Spiteri, Sr. .................... 174/87 |
| 5,439,031 | A | * | 8/1995 | Steele et al. .................. 138/89 |
| 5,514,836 | A | | 5/1996 | Delalle et al. |
| 5,589,666 | A | * | 12/1996 | DeCarlo et al. ............... 174/87 |
| 5,672,846 | A | * | 9/1997 | Debbaut ................... 174/84 R |
| 6,107,573 | A | | 8/2000 | Uchiyama et al. |
| 6,359,226 | B1 | | 3/2002 | Biddell et al. |
| 6,730,847 | B1 | * | 5/2004 | Fitzgerald et al. ......... 174/77 R |
| 6,913,486 | B2 | | 7/2005 | Nagayasu et al. |
| 6,930,252 | B2 | | 8/2005 | Ootsuki |
| 2002/0039858 | A1 | * | 4/2002 | Kamel et al. ................ 439/521 |

FOREIGN PATENT DOCUMENTS

| | | |
|---|---|---|
| DE | 4028769 | 3/1992 |
| EP | 0938159 | 8/1999 |
| JP | 11-233175 | 2/1998 |
| JP | 10-108345 | 4/1998 |
| JP | 11-178142 | 7/1999 |
| JP | 11-178143 | 7/1999 |

OTHER PUBLICATIONS

English language Abstract of JP 10-108345.
English language Abstract of JP 11-178142.
English language Abstract of JP11-178143.

* cited by examiner

*Primary Examiner*—William H Mayo, III
(74) *Attorney, Agent, or Firm*—Greenblum & Bernstein P.L.C.

(57) ABSTRACT

A method of waterproofing a terminal that includes a stopper inserted in one opening of a heat shrinkable tube. The heat shrinkable tube is heat-shrunk in this state to form a cap having a end closure. A fluid thermosetting waterproofing agent is injected into the cap from a second opening. A thermal splice, which is formed from welded strands stripped from a plurality of wire terminals, is inserted and immersed in the thermosetting waterproofing agent. Then, the entire cap is heated and heat-shrunk at a predetermined temperature and the thermosetting waterproofing agent is heat-hardened.

17 Claims, 4 Drawing Sheets

METHOD AND STRUCTURE FOR WATERPROOFING A TERMINAL SPLICE

CROSS-REFERENCE TO RELATED APPLICATIONS

The present disclosure relates to subject matter contained in priority Japanese Application No. 2004-263025, filed on Sep. 9, 2004, which is herein expressively incorporated by reference in its entirety.

BACKGROUND OF THE INVENTION

1. Field of the Invention

The present invention relates to a method and a structure for waterproofing a terminal splice, and in particular for waterproofing the terminal splice at a location where strands stripped from a plurality of wire terminals are connected.

2. Description of Related Art

A conventional method to electrically connect wires of a wire harness routed in an automobile is, as shown in FIG. 6, to weld and join strands Wa stripped from a plurality of wire W terminals to form a terminal splice Y. Waterproofing is required when terminal splice Y is placed in an area exposed to water as the wire harness is installed in a vehicle. FIG. 6 illustrates a conventional waterproofing method. In the conventional method, a specified amount of waterproofing agent 2 is injected into cap 1 from an injector (not shown in the figure) and terminal splice Y of each wire W is inserted into cap 1. Then, waterproofing agent 2 is hardened to seal terminal splice Y.

Injecting waterproofing agent 2 into cap 1, however, requires a certain internal diameter of cap 1 due to the injector's capability. Moreover, an external diameter of the cap is large compared to the size of terminal splice Y since cap 1 needs to be able to accommodate various sizes of terminal splices Y due to a large difference in their specifications. Since cap 1 used is large even if terminal splice Y is small, the cap occupies a space when terminal splice Y is placed in an external part, reducing space efficiency. Especially, when terminal splice Y is placed into a corrugated tube, a large-diameter corrugated tube is required, resulting in cost increase. In addition, the larger the internal diameter of cap 1 becomes, the more waterproofing agent 2 is required for the injection, which increases the cost of waterproofing agent 2.

Japanese Patent Laid-open Publication Hei 10-108345 provides a waterproofing method that tight-seals wire connection 3 as shown in FIG. 7. In the method, wire connection 3 having crimped part 3a, where a plurality of wire W strands are connected, is covered with heat shrinkable tube 4 having one end sealed by hot-melt 5. Butyl rubber 6 is injected inside heat shrinkable tube 4, which is then heat-treated to shrink the tube and to lower viscosity of butyl rubber 6 and spread the substance. Using butyl rubber 6 of low fluidity as filler, however, reduces workability when injecting butyl rubber 6 inside heat shrinkable tube 4. Moreover, waterproof performance may decline when butyl rubber 6 does not fill every gap between wires W and with heat shrinkable tube 4, depending on the location of butyl rubber 6 in heat shrinkable tube 4 or the heat level.

SUMMARY OF THE INVENTION

The present invention is provided to address at least the above noted shortcomings, to reduce the diameter of a cap necessary to cover a terminal splice and to improve workability and waterproof performance.

An aspect of the present invention provides a method of waterproofing a terminal splice including providing a heat shrinkable tube, the heat shrinkable tube having a first opening and a second opening; inserting a stopper in the first opening of the heat shrinkable tube; heat-shrinking the heat shrinkable tube having the stopper inserted therein, forming a cap having an end closure; injecting a fluid waterproofing agent into the cap through the second opening; inserting a terminal splice through the second opening of the cap and immersing the terminal splice in the waterproofing agent; and heating the cap at a predetermined temperature to heat-shrink the heat shrinkable tube and to accelerate hardening of the waterproofing agent.

Further, heating the cap comprises heating the entirety of the cap; and the terminal splice includes welded strands of wire stripped from a plurality of wire terminals. Additionally, the first opening includes a first open end and the second opening includes a second open end. Further, heating the cap includes heating the entirety of the cap, and heating the entire cap one time completes shrinkage of the heat shrinkable tube and hardens the waterproofing agent. Additionally, the waterproofing agent includes a two-liquid mixed type epoxy; and the stopper is formed of the same material as that for the heat shrinkable tube.

A further aspect of the present invention provides a waterproof terminal splice including a heat-shrunk tube having a first opening and a second opening; a cap having an end closure provided on the heat-shrunk tube, the cap including a stopper inserted in the first opening of the heat-shrunk tube; a waterproofing agent provided in an interior space of the heat-shrunk tube; and a terminal splice provided in the interior space of the heat-shrunk tube, the terminal splice immersed in the waterproofing agent.

Further, the waterproof agent is a cured fluid. The cap is heated at a predetermined temperature to heat-shrink the tube and to accelerate hardening of the fluid into the waterproofing agent. Additionally, the fluid is injected into the cap through the second opening and the cap is heated at a predetermined temperature to heat-shrink the tube and to accelerate hardening of the fluid into the waterproofing agent. Further, the stopper is inserted in the tube through the first opening and the tube is heated to heat-shrink the tube, forming a cap having an end closure. The terminal splice may include welded strands of wire stripped from a plurality of wire terminals; and the first opening includes a first open end and the second opening includes a second open end.

The method of the present invention, using the heat shrinkable tube as a cap, allows the cap to fit the terminal splice through heat-shrinkage by the heat and minimizes an external diameter of the heat shrinkable tube after heating. Accordingly, the method allows downsizing of an external part of the terminal splice and minimizes usage of the waterproof agent to be injected, enabling cost reduction. Furthermore, the compact cap that covers the terminal splice improves the appearance of the waterproof terminal splice.

An internal diameter of the heat shrinkable tube before heating can be large, improving workability as it is easy to inject the waterproofing agent into the cap. In addition, the molten waterproof agent has a high fluidity, which allows easier insertion into the cap and ensures that the agent spreads to every gap between wires and with the heat shrinkable tube, thus improves waterproof performance. Furthermore, heating and heat-shrinking the heat shrinkable tube accelerates hardening of the waterproofing agent at the same time, curbing increase in process time and steps. Heat-shrinking one opening of the heat shrinkable tube, while the stopper is inserted in the other opening of the tube, firmly attaches the stopper to the opening, thus improves air tightness at the end closure. It is preferable that the fluid waterproofing agent before hardening has a low viscosity of 50 Pa·s.

Additionally, heating the entire the cap one time is preferable since shrinkage of the heat shrinkable tube and hardening of the waterproofing agent is completed. As the waterproofing agent is injected into the cap, it is preferable to use a two-liquid mixed type epoxy resin. The two-liquid mixed type epoxy resin has a low viscosity and good permeability at an ambient temperature, allowing easy handling. Alternatively, it is also possible to provide a one-liquid thermosetting waterproofing agent, which is a liquid at an ambient temperature, as the waterproofing agent, instead of a thermosetting waterproofing agent that starts hardening when two liquids are mixed and accelerates hardening when heated.

It is desirable to use the same material to form the stopper for the end closure as that for the heat shrinkable tube, since a high affinity between the heat shrinkable tube and the stopper is provided and air tightness is improved.

The present invention also provides a waterproof structure for the terminal splice formed in the method of the present invention.

As described above, the present invention, employing the heat shrinkable tube to reduce the size of the cap after heating, reduces the size of an external part of the terminal splice and reduces usage of the waterproofing agent, contributing to cost reduction. Furthermore, high fluidity of the liquid waterproofing agent before heating improves workability when injecting the agent into the cap and waterproofing performance.

BRIEF DESCRIPTION OF THE DRAWINGS

The above, and other objects, features and advantages of the present invention will be made apparent from the following description of the preferred embodiments, given as non-limiting examples, with reference to the accompanying drawings in which.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
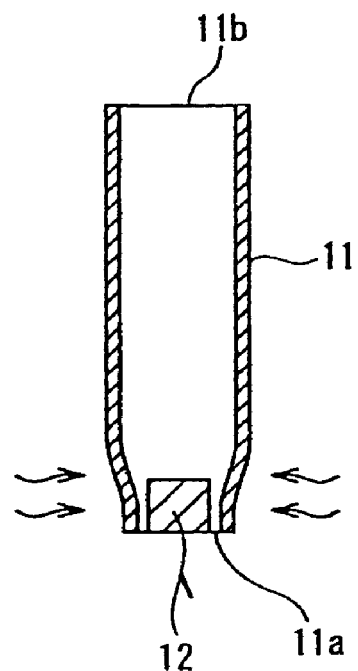
FIG. 1 is a cross sectional view of a first step in a process for waterproofing a terminal splice according to an embodiment of the present invention.
Figure 2:
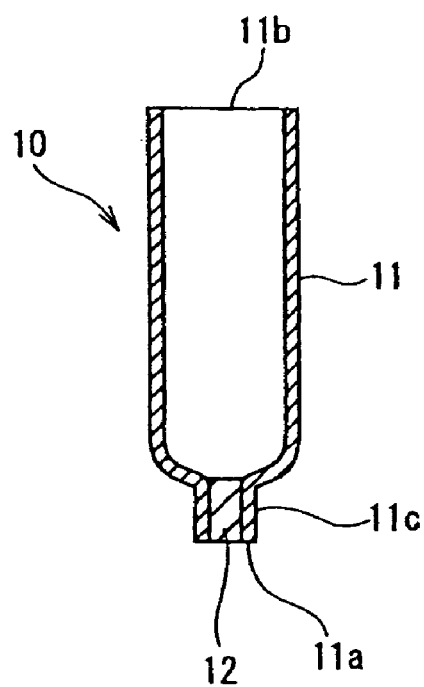
FIG. 2 is a cross sectional view of a second step in the process for waterproofing the terminal splice of FIG. 1.

The following describes an embodiment of the present invention with reference to the drawings. FIGS. 1, 2, 3, 4 and 5 illustrate procedures of the method that waterproof a terminal splice according to the embodiment of the present invention. As shown in FIG. 1, heat shrinkable tube 11 has a first, slightly heat-shrunk opening 11a at a lower end and a second opening 11b at an upper end. Stopper 12 is inserted and located in opening 11a and the lower end of heat shrinkable tube 11 is heated while stopper 12 is positioned inside the opening 11a. Heating is indicated by the arrows in FIG. 1. Then, as shown in FIG. 2, the lower end of heat shrinkable tube 11 further heat-shrinks and stopper 12 melts and adheres to opening 11a, forming cap 10 having end closure 11c. Stopper 12 may be formed of the same material as used for heat shrinkable tube 11. Heat shrinkable tube 11 uses Sumitomo Electric Fine Polymer Sumitube®.

Figure 3:
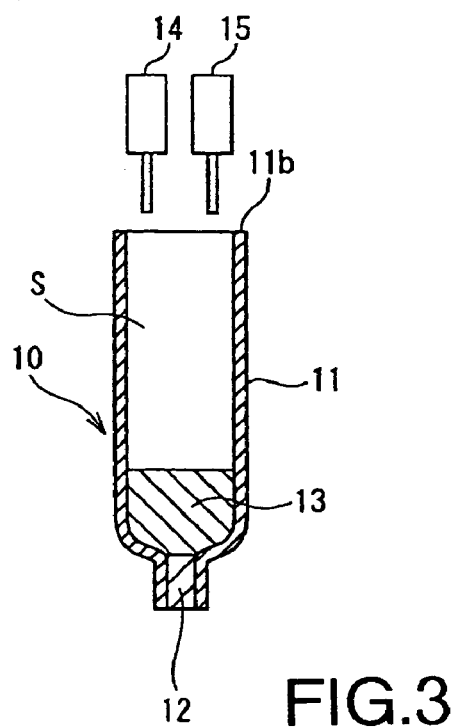
FIG. 3 is a cross sectional view of a third step in the process for waterproofing the terminal splice of FIG. 1.
Figure 4:
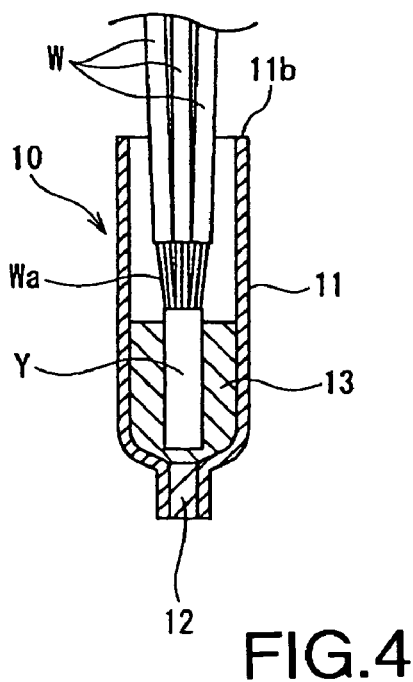
FIG. 4 is a cross sectional view of a fourth step in the process for waterproofing the terminal splice of FIG. 1.

As shown in FIG. 3, thermosetting waterproofing agent 13 is injected into cap 10 through second opening 11b. In particular, an appropriate amount of a two-liquid mixed type epoxy solution as thermosetting waterproofing agent 13 is injected from first dispenser 14. At the same time, an appropriate amount of a curing agent is injected from second dispenser 15. Taking into consideration the size, including and in particular the internal volume, that the heat shrinkable tube will be after heat shrinkage, a predetermined amount of thermosetting waterproofing agent 13 is injected, leaving space S having second opening 11b. It is noted that since the internal volume of the heat shrinkable tube will be smaller after shrinkage, the predetermined amount of thermosetting waterproofing agent to be injected into the heat shrinkable tube will be smaller than an amount that would be needed to fill the internal volume of the heat shrinkable tube before shrinking. Then, as shown in FIG. 4, terminal splice Y, that is, a connection of welded strands Wa stripped from terminals of a plurality of wires W, is inserted through second opening 11b of cap 10 and the terminal splice is immersed in thermosetting waterproofing agent 13. By employing an epoxy solution that has a low viscosity even at an ambient temperature as thermosetting waterproofing agent 13 in this embodiment, it is possible to ensure that thermosetting waterproofing agent 13 spreads into every gap between terminal splice Y, strands Wa, and cap 10.

Figure 5:
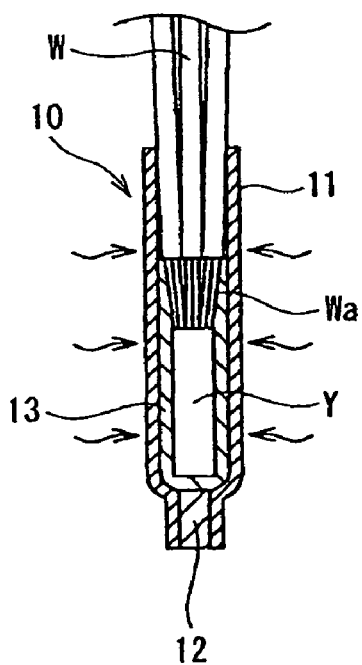
FIG. 5 is a cross sectional view of a fifth step in the process for waterproofing the terminal splice of FIG. 1.
Figure 6:
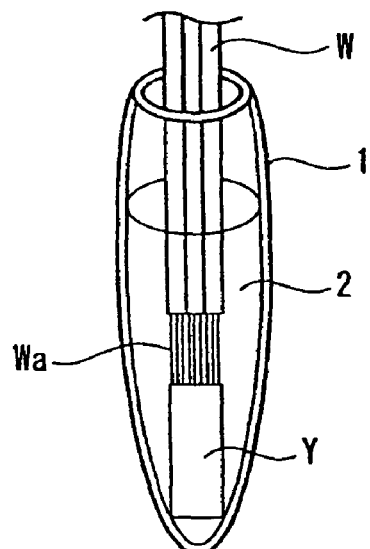
FIG. 6 illustrates a conventional example of a waterproof splice.
Figure 7:
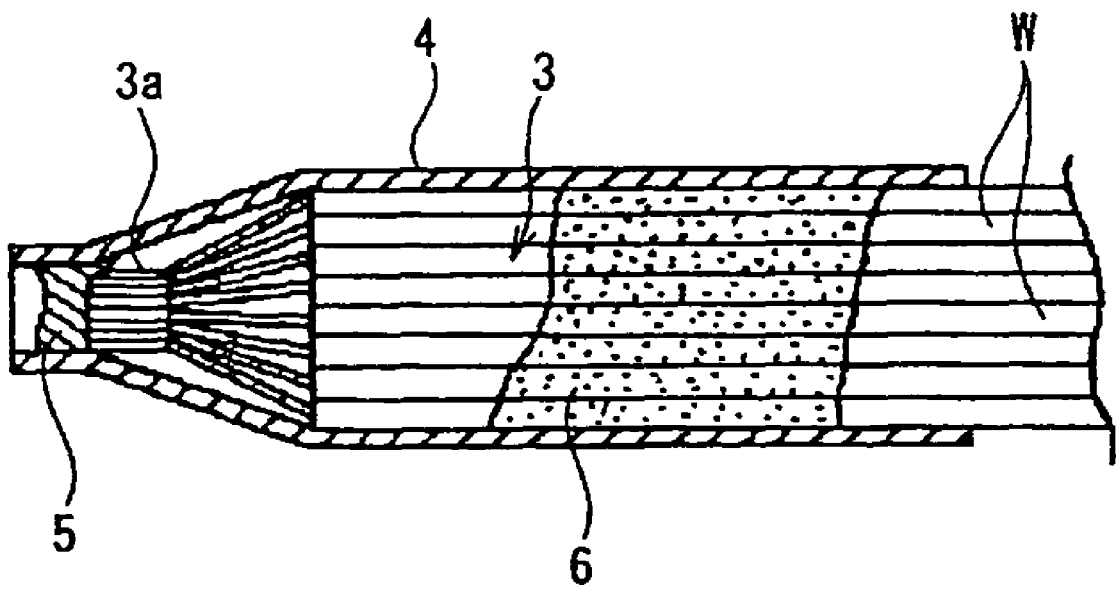
FIG. 7 illustrates another conventional example of a waterproof splice.

As shown in FIG. 5, entire cap 10 is heat-shrunk to shorten the diameter of heat shrinkable tube 11 to fit wire W and to accelerate hardening of thermosetting waterproofing agent 13. Heating is indicated by the arrows in FIG. 5. The two-liquid mixed type epoxy solution hardens when mixed with the curing agent and left to stand. Heating entire cap 10 reduces the time necessary for the mixture to stand and quickens the hardening of thermosetting waterproofing agent 13 after heat shrinkable tube 11 hardens. During the process, heat shrinkage of heat shrinkable tube 11 reduces an inner volume of cap 10, raises the liquid surface of thermosetting waterproofing agent 13 and completely waterproofs a circumference of terminal splice Y. The heating temperature in the heating treatment may be any appropriate temperature, and in the present embodiment is 110° C. to 150° C. The heating time of this heating treatment may be any appropriate heating time and in the present embodiment, the heating time is 3 to 10 seconds.

The above discussed method reduces the diameter of cap 10 that surrounds terminal splice Y, thus reducing the size of a corrugated tube and other external portions of cap 10 and lowers the cost. The method also reduces the cost of a waterproofing agent since a smaller amount of thermosetting waterproofing agent 13 is used in the process due to heat shrinkage of cap 10. Further, using the two-liquid mixed type epoxy solution as thermosetting waterproofing agent 13 allows rapid hardening of heat shrinkable tube 11 through the heating process and reduction of the time necessary to let the mixture stand until the mixture hardens.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention and in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

What is claimed is:

1. A waterproof terminal splice comprising:
   a heat-shrunk tube having a first opening and a second opening;
   a cap having an end closure provided on said heat-shrunk tube, said cap comprising a stopper inserted in said first opening of said heat-shrunk tube, said stopper and said heat shrunk tube being formed of the same material;
   a waterproofing agent provided in an interior space of said heat-shrunk tube in an amount corresponding to the shrinkage amount of the heat-shrunk tube, the waterproofing agent being injected with a hardening agent and being formed of two-liquid mixture-type epoxy resin; and
   a terminal splice provided in said interior space of said heat-shrunk tube, said terminal splice immersed in said waterproofing agent, such that said heat-shrunk tube is fitted to the wire terminals to allow the waterproofing agent to infiltrate gaps between the terminal splice, strands of the terminal splice, and an internal surface of the cap, and generally the entirety of said cap is shrunk concurrently with a hardening of said waterproofing agent.

2. The waterproof terminal splice in accordance with claim 1, wherein said waterproof agent is a cured fluid.

3. The waterproof terminal splice in accordance with claim 2, wherein said cap is heated at a predetermined temperature in its entirety once to heat-shrink said tube and to accelerate hardening of said fluid into said waterproofing agent.

4. The waterproof terminal splice in accordance with claim 2, wherein said fluid is injected into said cap through said second opening and said cap is heated at a predetermined temperature to heat-shrink said tube and to accelerate hardening of said fluid into said waterproofing agent.

5. The waterproof terminal splice in accordance with claim 1, wherein said stopper is inserted in said tube through said first opening and said tube is heated to heat-shrink said tube, forming a cap having an end closure.

6. The waterproof terminal splice in accordance with claim 1, wherein said terminal splice comprises welded strands of wire stripped from a plurality of wire terminals.

7. The waterproof terminal splice in accordance with claim 6, wherein heating said cap results in said cap contacting generally an entire outer diameter portion of said plurality of wire terminals inserted into said second opening.

8. The waterproofing terminal splice according to claim 7, wherein said waterproofing agent is disposed entirely within a region of said cap containing said terminal splice.

9. The waterproof terminal splice in accordance with claim 1, wherein said first opening comprises a first open end and said second opening comprises a second open end.

10. A method of waterproofing a terminal splice comprising:
    providing a heat shrinkable tube, said heat shrinkable tube having a first opening and a second opening;
    inserting a stopper in said first opening of said heat shrinkable tube, the stopper and the heat shrinkable tube being formed of the same material;
    heat-shrinking said heat shrinkable tube having said stopper inserted therein only at the portion of the heat shrinkable tube having said stopper, forming a cap having an end closure;
    subsequently injecting a fluid waterproofing agent into said cap through said second opening in an amount corresponding to a subsequent shrinkage amount of the heat shrinkable tube so that there is a space from the second opening, the waterproofing agent being injected with a hardening agent and being formed of two-liquid mixture-type epoxy resin;
    subsequently inserting a terminal splice through said second opening of said cap and immersing said terminal splice in said waterproofing agent; and
    subsequently heating the entire said cap at a predetermined temperature to heat-shrink said heat shrinkable tube so as to be fitted to the wire terminals and to allow the waterproofing agent to infiltrate gaps between the terminal splice, strands of the terminal splice, and an internal surface of the cap, and to accelerate hardening of said waterproofing agent, such that generally the entirety of said cap shrinks concurrently with the hardening of said waterproofing agent.

11. The method of waterproofing a terminal splice according to claim 10, wherein heating the entire cap comprises heating the entirety of said cap once, and the heating completes shrinkage of the heat shrinkable tube.

12. The method of waterproofing a terminal splice according to claim 10, wherein said terminal splice comprises welded strands of wire stripped from a plurality of wire terminals.

13. The method of waterproofing a terminal splice according to claim 12, wherein heating said cap results in said cap contacting generally an entire outer diameter portion of said plurality of wire terminals inserted into said second opening.

14. The method of waterproofing a terminal splice according to claim 13, wherein said waterproofing agent is disposed entirely within a region of said cap containing said terminal splice.

15. The method of waterproofing a terminal splice according to claim 10, wherein said first opening comprises a first open end and said second opening comprises a second open end.

16. The method of waterproofing a terminal splice according to claim 10, wherein heating said cap comprises heating the entirety of said cap, and heating said entire cap one time completes shrinkage of said heat shrinkable tube and hardens said waterproofing agent.

17. A waterproof terminal splice manufactured in accordance with the method of claim 10.

* * * * *